United States Patent

[15] 3,640,508

Reibig

[45] Feb. 8, 1972

[54] VIBRATION FORCE GENERATOR
[72] Inventor: Eric A. Reibig, Waukegan, Ill.
[73] Assignee: All American Tool & Mfg. Co., Skokie, Ill.
[22] Filed: June 25, 1969
[21] Appl. No.: 836,534

[52] U.S. Cl. .................................................. 259/72, 74/87
[51] Int. Cl. ............................................................ B01f 9/00
[58] Field of Search ........... 259/12, 29, 54, 72, 173, DIG. 42, 259/1 R; 74/87

[56] References Cited

UNITED STATES PATENTS

| | | | |
|---|---|---|---|
| 2,778,231 | 1/1957 | De Gail | 259/1 R X |
| 3,183,630 | 5/1965 | Wright | 259/72 X |
| 3,277,731 | 10/1966 | Pinson | 259/DIG. 42 |

FOREIGN PATENTS OR APPLICATIONS

| | | | |
|---|---|---|---|
| 894,514 | 3/1944 | France | 258/DIG. 42 |
| 1,213,355 | 3/1966 | Germany | 259/DIG. 42 |

Primary Examiner—Dave W. Arola
Attorney—Dominik, Knechtel & Godula

[57] ABSTRACT

A reaction-type vibration generator which includes, generally, a housing having therein two fixed shafts which are geared together so that they rotate synchronously in opposite directions. Each of these two fixed shafts having an eccentric mass affixed to it, which mass comprises a portion one-half of the total mass rotated by that shaft. These shafts each further have a sleeve disposed concentrically about it, and these sleeves each support the other portion (one-half) of the total mass rotated by the individual shafts. The sleeves further are keyed to the shafts by means of a pair of toothed gears affixed to the shafts and to the sleeves, respectively, in a fashion such that the assembly can be easily loosened, the sleeves angularly rotatably displaced with respect to the shafts to vary the net unbalanced mass to, in turn, vary the amplitude of vibration of the vibration generator, and then fixedly keyed together again so that the masses affixed to the fixed shafts and to the sleeves rotate in synchronism. Scale means are associated with each shaft and sleeve combination, to accurately establish the desired amplitude of vibration.

10 Claims, 9 Drawing Figures

INVENTOR
Eric A. Reibig

BY
Dominik, Knechtel & Jodula
ATTYS.

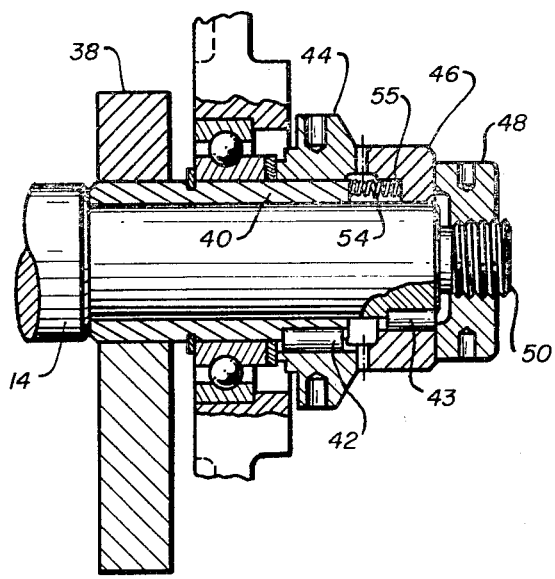
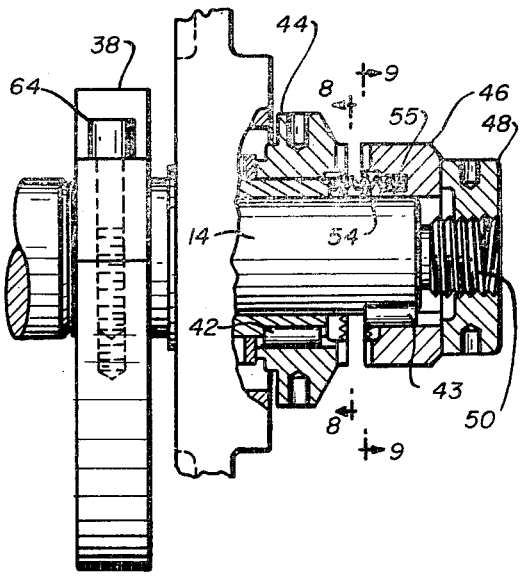
FIG. 6 　　　　　FIG. 7
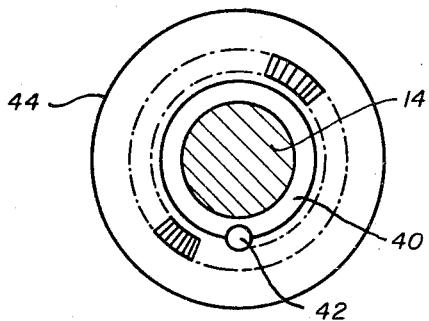
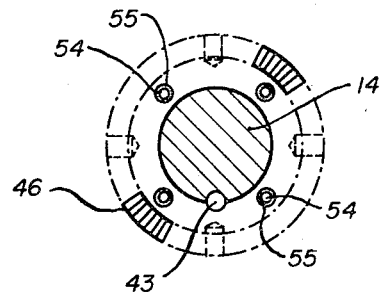
FIG. 8 　　　　　FIG. 9
INVENTOR
Eric A. Reibig
BY
Dominik, Knechtel & Godula
ATTYS.

VIBRATION FORCE GENERATOR

This invention relates to an improved reaction-type vibration generator.

Every mechanical assembly contains parts possessing mass supported by members possessing elasticity, and all such combinations have a natural period of vibration. If they are forced to vibrate at the frequency of their natural period, they may move over a large amplitude with the application of relatively little energy. Such resonant conditions often occur at unexpected places, and unless tests are made to determine and eliminate these conditions, destructive stresses may result, terminating in fractures, breaks or other failures. Components of aircraft, automotive, marine craft and certain industrial and domestic equipment must be tested under conditions of vibration more stringent than are encountered in service to insure against failure, for their continued operation under all conditions is of vital importance.

One manner in which various articles of this type are tested is by means of a vibration fatigue testing machine. These machines normally include a freely suspended table to which the articles can be securely affixed, and a vibration generator usually is affixed to and adapted to vibrate both the table and the article, over a wide frequency range and at different amplitudes of vibration. Reaction-type vibration generators have been used for some time in these machines, to vibrate the table thereof, since they probably form the simplest and most sturdy equipment for producing vibrations.

The simplest reaction-type vibration generator consists of a housing carrying a shaft on which is mounted an eccentric mass. The housing is affixed to the table of the fatigue testing machine, and when the shaft is rotated, the centrifugal force of the unbalanced mass creates reactions against the housing having a tendency to move the house, and hence the table, in an opposite direction at any point during complete rotation. In those cases where vibrations which are linear and follow the law of harmonic motion are desired, the vibration generators usually include within the housing two oppositely rotating shafts with unbalanced mass which are geared together so that they rotate synchronously in opposite directions.

It is generally well known that the amount of vibration amplitude produced by this type of vibration generator is given by the equation:

$$\frac{\text{amplitude of vibration}} = \frac{\text{small mass} \times \text{radius of gyration}}{\text{large mass}}$$

In order to be able to control amplitudes at will, many of the vibration generators include a provision for either changing the radius of gyration of the unbalanced mass or for varying the net unbalanced mass. The latter design is probably more commonly used than the former, and usually split masses are provided so that the net unbalanced mass can be varied by physically angularly displacing on the shaft or shafts one portion of the mass with respect to the other.

Physically angularly displacing one portion of the mass with respect to the other on the shaft is generally a relatively difficult and time-consuming task. This is due to the fact that the masses are affixed to the shaft or shafts and, furthermore, are enclosed within the housing. The latter, in most cases, in addition, is affixed to the underside of the table of the vibration fatigue testing machine, within an enclosure. Accordingly, in order to physically angularly displace the split masses with respect to one another to vary the amplitude of vibration, the whole machine has to be disassembled just to gain access to the split masses. It therefore would be extremely advantageous if some relatively simple arrangement is provided to angularly adjustably position the split masses, so that the amplitude of vibration can be easily and quickly varied, to eliminate the need to disassemble the machine which, of course, would substantially reduce the downtime of the machine.

Accordingly, it is an object of the present invention to provide improved reaction-type vibration generators.

More specifically, an object is to provide improved reaction-type vibration generators having provisions whereby the amplitude of vibration thereof can be easily and quickly variably adjusted.

A still further object is to provide improved reaction-type vibration generators having provisions whereby the amplitude of vibration thereof can be easily and quickly variably adjusted, without the necessity of disassembling it as in the past and without the need of any special tools.

Still another object is to provide improved reaction-type vibration generators of the above-described type constructed in a fashion such that the amplitude of vibration thereof can be variably adjusted in exact increments, from a maximum to a minimum value.

Still another object is to provide improved reaction-type vibration generators of the above-described type constructed in a fashion such as to maintain amplitudes substantially constant once adjusted to the desired amplitude of vibration.

A still further object is to provide improved reaction-type vibration generators of the above-described type which are relatively simple in construction and are substantially maintenance free in comparison to most presently available (one-half) portion (one-half) vibration generators which likewise have provisions for adjusting the amplitude of vibration thereof.

Other objects of the invention will in part be obvious and will in part appear hereinafter.

The above objectives are accomplished with a reaction-type vibration generator which includes, generally, a housing having therein two fixed shafts which are geared together so that they rotate synchronously in opposite directions. Each of these two fixed shafts having an eccentric mass affixed to it, which mass comprises a portion ½ of the total mass rotated by that shaft. These shafts each further have a sleeve disposed concentrically about it, and these sleeves each support the other portion (one-half of the total mass rotated by the individual shafts. The sleeves further are keyed to the shafts by means of a pair of toothed gears affixed to the shafts and to the sleeves, respectively, in a fashion such that the assembly can be easily loosened, the sleeves angularly rotatably displaced with respect to the shafts to vary the net unbalanced mass to, in turn, vary the amplitude of vibration of the vibration generator, and then fixedly keyed together again so that the masses affixed to the fixed shafts and to the sleeves rotate in synchronism. Scale means are associated with each shaft and sleeve combination, to accurately establish the desired amplitude of vibration.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 6 is a partial view of the vibration generator illustrating the construction of the adjusting assembly thereof, the latter being sectionalized and illustrated in its locked position;

FIG. 7 is a view like FIG. 6, however, illustrating the adjusting assembly in its unlocked position so as to permit the eccentric masses to be angularly adjustably positioned with respect to one another;

FIG. 8 is a sectional view taken along lines 8—8 of FIG. 7; and

FIG. 9 is a sectional view taken along lines 9—9 of FIG. 7.

Similar reference characters refer to similar parts throughout the several views of the drawings.

Figure 1:
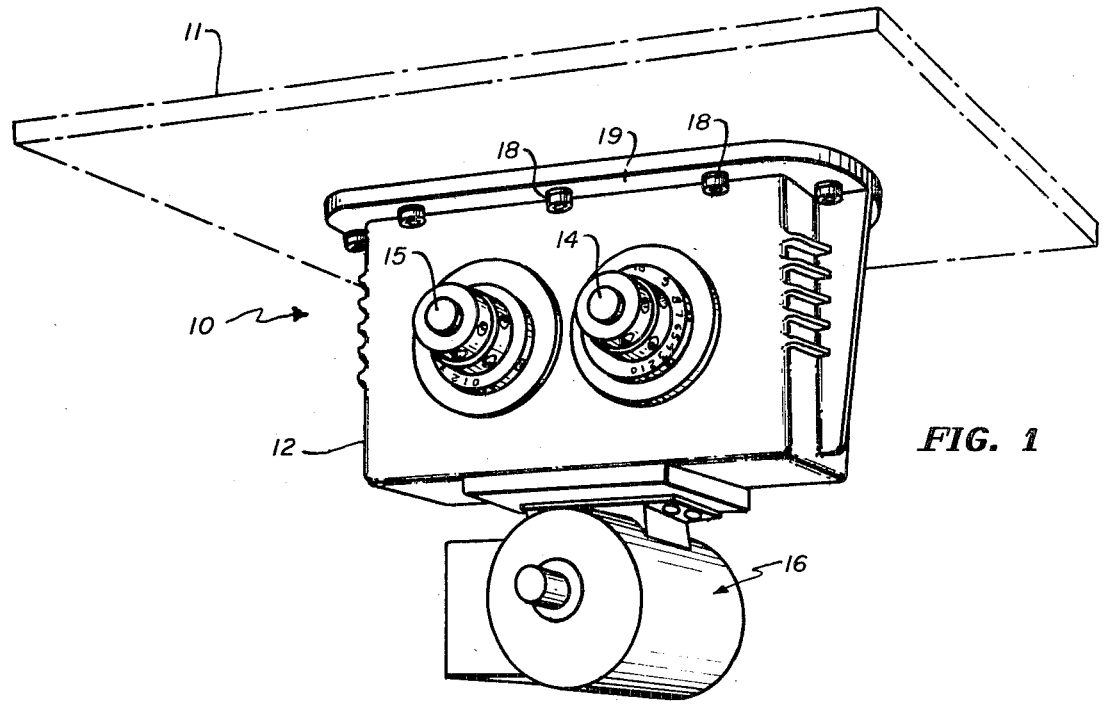
FIG. 1 is a perspective view of a vibration generator exemplary of the present invention, affixed to the underside of the table of a vibration fatigue testing machine.

Referring now to the drawings, in FIG. 1 there is illustrated a vibration generator 10 exemplary of the present invention affixed to the underside of table 11 which may be, for example, the table of a vibration fatigue testing machine (not shown). The vibration generator 10 is easily affixed to the table 11 by means of threaded screws 18 extended through a peripheral flange 19 integrally formed with the housing 12 of the vibration generator. Affixed beneath the vibration generator 10 is a motor 16 which is coupled to and adapted to rotate a drive shaft 14, in a manner described more fully below. The drive shaft 14, in turn, is geared to and rotates an idler shaft 15. Eccentric masses, 34, 35 and 36, 37 are affixed to the drive shaft 14 and the idler shaft 15, respectively (see FIG. 5), and when the drive shaft and the idler shaft are rotated, the centrifugal force of the eccentric weights, when unbalanced, creates reactions against the housing 12 of the vibration generator 10 having a tendency to move the housing, and hence the table 11, in an opposite direction at any point during complete rotation. This operation of a reaction-type vibration generator such as the vibration generator 10 is generally well known.

Figure 5:
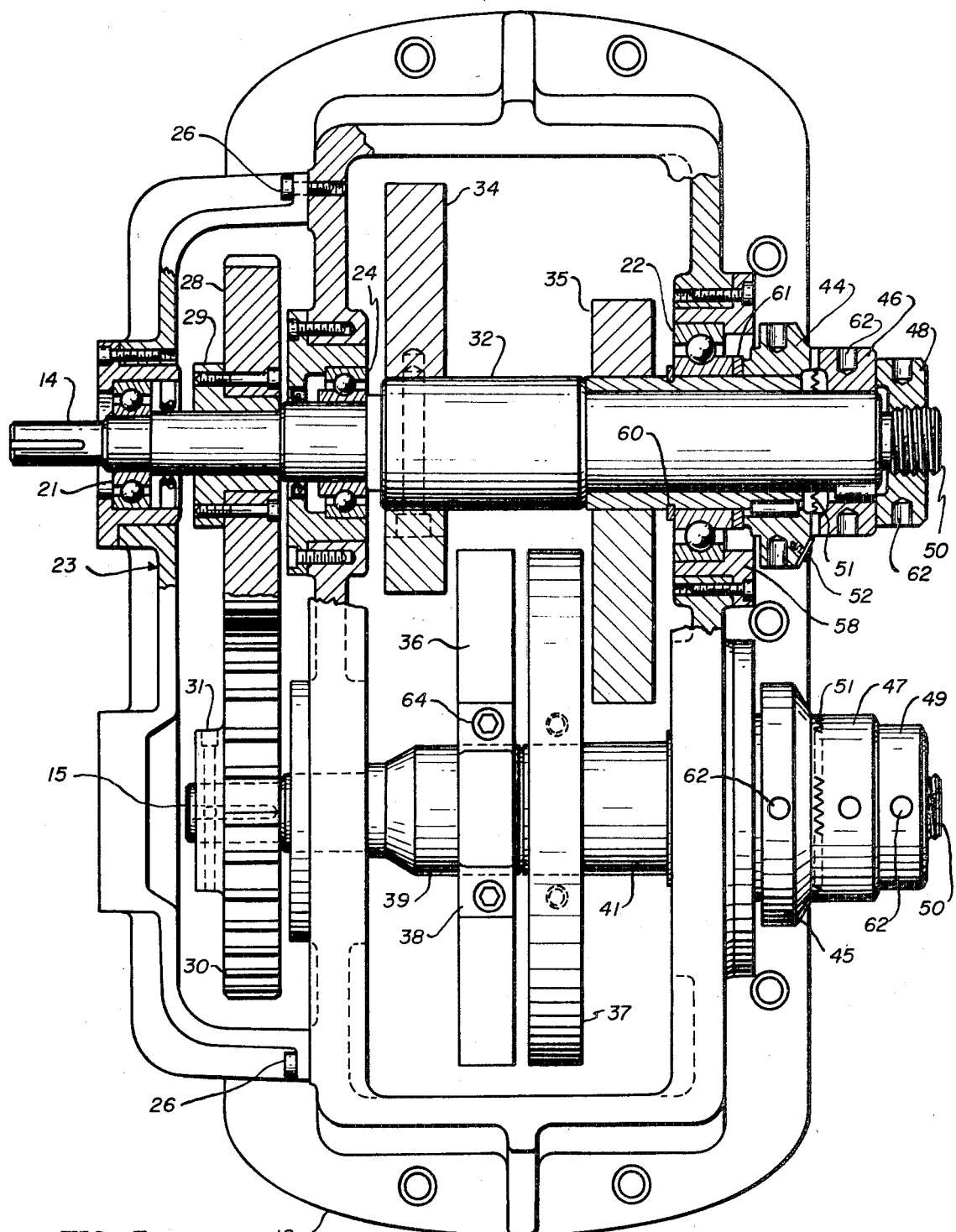
FIG. 5 is a top plan view, partially sectionalized, of the vibration generator.

As can be best seen in FIG. 5, the drive shaft 14 is rotatably and fixedly supported by means of a bearing 21 retained within a gear housing 23 removably affixed to the housing 12 and by means of bearings 22 and 24 affixed to the housing 12. The drive shaft 14 has a V-belt pulley or a timing belt pulley (not shown) affixed to its one end which is coupled to and driven by means of the motor 16, to rotate the drive shaft 14. The motor 16 preferably is a variable speed motor so that the vibration generator 10 can be operated over a wide frequency range. The gear housing 23 is removably affixed to the housing 12 by means of threaded screws 26 so that the gear housing 23 can be easily removed to inspect the spiral gears 28 and 30 protectively enclosed therein.

The idler shaft 15 is rotatably supported within the housing 12 by means of bearings like the bearings 22 and 24, and in generally the same fashion. It may be noted, however, that the left end (as illustrated) of the idler shaft 15 need not project out of the gear housing 23, as in the case of the drive shaft 14. The spiral gear 28 is fixedly secured to the drive shaft 14 by means of a taper pin (not shown) extended through the spiral gear hub 29 and furthermore, is meshed with and drives the spiral gear 30. The spiral gear 30 likewise is fixedly secured to the idler shaft 15 by means of a taper pin 31 extended through its hub and the idler shaft 15. It may be noted that, with this arrangement, the idler shaft 15 is rotated in a direction opposite to the direction of rotation of the drive shaft 14, when the latter is rotatably driven by means of the motor 16.

Figure 2:
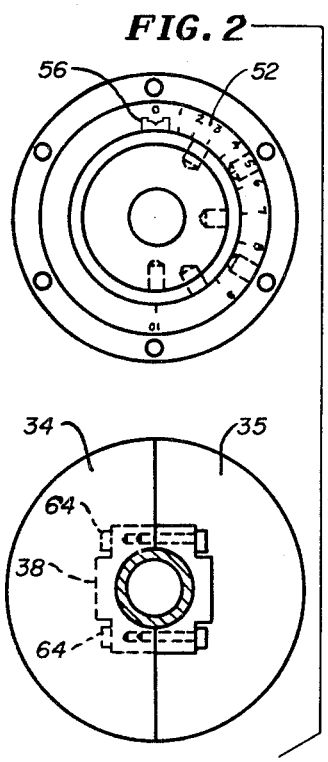
FIGS. 2–4 are views generally illustrating the manner in which the eccentric masses enclosed within the housing of the vibration generator are angularly adjustably positioned to vary the amplitude of vibration of the vibration generator.
Figure 3:
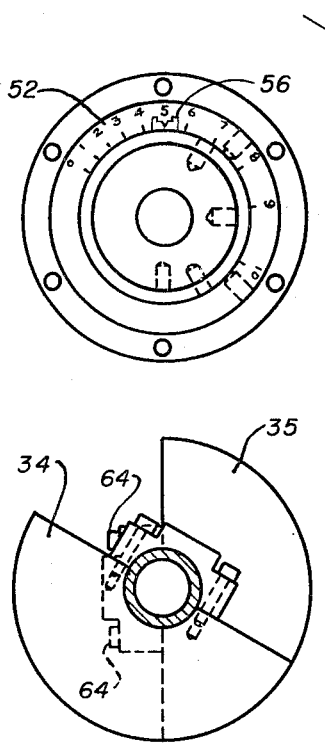
Figure 4:
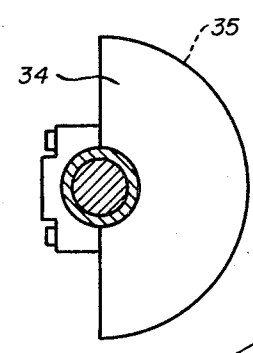

The eccentric weights 34 and 35, as can be best seen in FIGS. 2–4, each are semicircular in shape, as are the eccentric weights 36 and 37. The eccentric weight 34 is fixedly secured to an enlarged diameter portion 32 of the drive shaft 14 by means of a generally U-shaped clamp 38, so as to be eccentrically affixed to the drive shaft 14, in the manner best shown in FIGS. 2–4. It may be noted that the eccentric weight 34 and the clamp 38 are affixed to the drive shaft 14 by means of threaded bolts 64 so that the eccentric weight can be easily removed and replaced by means of, for example, an eccentric weight of a greater mass so that the maximum vibration amplitude of the vibration generator 10 can be increased or decreased.

The eccentric mass 35 is affixed in a similar fashion, that is, by means of a clamp 38, to a short sleeve 40 which is concentrically and rotatably disposed about the drive shaft 14. The outer diameter of the short sleeve 40 corresponds to the diameter of the large diameter portion 32 of the drive shaft 14 so that the eccentric weights 34 and 35 are of the same radius, as can be best seen in FIG. 2.

An adjusting dial 44 is concentrically disposed about the end of the short sleeve 40, exteriorly of the housing 12 of the vibration generator 10, and is keyed to and rotatable with the short sleeve 40, by means of a key 42.

A clutch 46 is concentrically disposed about the end of the drive shaft 14 and is fixedly secured to the latter so as to be rotatable with it, by means of a key 43. The mating faces of the adjusting dial 44 keyed to the short sleeve 40 and the clutch 46 keyed to the drive shaft 14 have teeth 51 on them which are adapted to meshingly engage to lockingly affix the adjusting dial 44 and the clutch 46 together. The teeth 51 on the adjusting dial 44 and the clutch 46 are maintained meshed together by means of a locknut 48 threadedly affixed to the threaded end portion 50 on the drive shaft 14. As can be seen, by threadedly tightening the locknut 48, the latter abuts against the clutch 46 to forcibly urge the teeth thereon in meshing engagement with the teeth on the adjusting dial 44. Accordingly, it can be seen that with this arrangement, the short sleeve 44 with the eccentric weight 35 affixed to it is caused to rotate along with the drive shaft 14 and the eccentric weight 34 affixed thereto.

A short sleeve 40 is positionably affixed on the drive shaft 14 by means of a lockring 60. Also, a spacer ring 61 is disposed between the bearing 22 and the adjusting dial 44 to positionably space the latter.

The eccentric weight 36 is replaceably fixedly secured to an enlarged diameter portion 39 of the idler shaft 15 by means of a clamp 38. The eccentric weight 37 similarly is fixedly secured to a sleeve 41 which is concentrically disposed about and rotatable on the idler shaft 15. This sleeve 41 has a diameter corresponding to the diameter of the large diameter portion 39 of the idler shaft 15 so that the eccentric weights 36 and 37 are of the same radius, as in the case of the eccentric weights 34 and 35 affixed to the drive shaft 14 and the short sleeve 40, respectively. It may be noted that the eccentric weights 36 and 37 are disposed closely together and are spaced between the eccentric weights 34 and 35.

An adjusting dial 45 is keyed to the sleeve 41 and a clutch 47 is keyed to the idler shaft 15, in the same manner as described above in the case of the adjusting dial 44 and the clutch 46. The adjusting dial 45 and the clutch 47 likewise have teeth 51 on the mating surfaces thereof, and a locknut 49 is threadedly affixed to the end of the idler shaft 15 and is adapted to meshingly engage the teeth 51 on the adjusting dial 45 and the clutch 47, as in the case of the locknut 48. Accordingly, in this case also, the sleeve 41 with the eccentric weight 37 affixed to it rotates with the idler shaft 15 having the eccentric weight 36 affixed thereto.

As indicated above, in order to be able to control the amplitude of vibration of reaction-type generators, many of the vibration generators include a provision for either changing the radius of gyration of the unbalanced mass or for varying the net unbalanced mass. In the instant case, the amplitude of vibration of the vibration generator 10 is controlled by varying the net unbalanced mass, by physically angularly displacing the eccentric weight 34 with respect to the eccentric weight 35, and by physically angularly displacing the eccentric weight 36 with respect to the eccentric weight 37. The angular displacement between the eccentric weights 34 and 35 and between the eccentric weights 36 and 37, of course, must be the same in order to provide vibrations which are linear and follow the law of harmonic motion. Furthermore, as indicated above, prior to the advent of the present invention, physically angularly displacing the eccentric weights with respect to each other is a relatively difficult and time-consuming task. This is due to the fact that the vibration generator normally had to be physically removed from beneath the table of the vibration fatigue testing machine in order to gain access to the eccentric weights closed within the housing so that the weights could be loosened and repositioned on the shaft or shafts within the housing. With the above-described arrangement and construction of the vibration generator 10, physically angularly displacing the eccentric weights to vary the amplitude of vibration of the vibration generator 10 can be easily and quickly accomplished, without the necessity of removing the housing 12 from the table 11 or otherwise disassembling the vibration generator.

This is accomplished in the following manner. In order to physically angularly displace the eccentric weight 34 with respect to the eccentric weight 35, the locknut 48 first is loosened. Thereafter, the clutch 46 is slidably displaced on the drive shaft 14 to disengage the teeth on the clutch 46 and the adjusting dial 44, as illustrated in FIG. 7. Preferably, a number of springs 54 (four as illustrated) are disposed within cavities 55 positionably spaced about the diameter of the clutch 46, so that the springs bear against the adjusting dial 44 to bias the clutch 46 outwardly on the drive shaft 14 and against the locknut 48. Therefore, when the locknut 48 is loosened, the teeth 51 on the clutch 46 are automatically disengaged with the teeth on the adjusting dial 44. With the teeth 51 disengaged, the drive shaft 14, for example, can be held fixed by gripping the clutch 46 and the sleeve 40 angularly rotatably displaced with respect to it, by gripping and rotating the adjusting dial 44. The clutch 46 has an index marker or pointer 56 (FIG. 2) affixed to it and this index marker functions in conjunction with the displacement scale 52 on the adjusting dial 44, to visually indicate the relationship of the eccentric weights 34 and 35 with respect to one another, as more fully described below.

In FIG. 2, it can be seen that the index marker 56 is aligned with the zero indicia on the displacement scale 52. With this setting, the eccentric weights 34 and 35 are diametrically disposed with respect to one another, as illustrated, and the amplitude of vibration will be zero. In FIG. 4, the index marker 56 is aligned with the indicia 10 on the displacement scale 52, and the eccentric weights 34 and 35 are angularly aligned so that the total mass thereof is eccentrically disposed on one side of the drive shaft 14. In this position, he amplitude of vibration of the vibration generator 10 will be at a maximum value. The remaining indicia on the displacement scale 52 is calibrated in a fashion such that the amplitude of vibration can be varied in tenths, from a minimum to a maximum value. For example, as illustrated in FIG. 3, the index marker 56 is aligned with the indicia 5 of the displacement scale, and the eccentric weights 34 and 35 are angularly displaced with respect to one another such that the amplitude of vibration of the vibration generator 10 will be 50 percent of the maximum possible amplitude of vibration.

The eccentric weights 37 and 38, of course, are angularly adjustably displaced with respect to one another, in an amount equal to the angular displacement of the eccentric weights 34 and 35. In other words, if the index marker 56 is aligned with the indicia 5 on the displacement scale 52, the index marker affixed to the clutch 47 must be likewise aligned with the indicia 5 on the displacement scale affixed to the adjusting dial 45.

From the above description, it can be seen that the two pairs of eccentric weights 34, 35 and 37, 38 can be easily and quickly angularly adjustably positioned so as to vary the amplitude of vibration of the vibration generator 10. Furthermore, the amplitude of vibration can be varied, without the necessity of removing the vibration generator and physically disassembling and displacing them. The adjusting scales and the index markers associated with the adjusting dials and the clutch also permit the amplitude of vibration to be adjusted in a known manner.

The locknuts 48 and 49, the clutches 46 and 47 and the adjusting dials 44 and 45 all preferably have a number of recessed cavities 62 provided in them, for receiving the ends of a pair of lever bars (not shown). These lever bars are advantageously used to facilitate loosening and tightening the locknuts 48 and 49 since the latter should be securely tightened against the clutches 46 and 47. This, of course, is accomplished by extending one end of the lever bars in the cavities 62 in the locknut and in the clutch, respectively, and exerting opposite rotational forces on the lever bar to loosen or tighten the locknut. Thereafter, the lever bar is removed from the locknut and inserted in the cavity 62 in the adjusting dial, to assist in angularly rotating one pair of the eccentric weights with respect to one another.

It will thus be seen that the objects set forth above, among those made apparent from the preceding description are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A reaction-type vibration generator comprising a housing; at least one shaft having a mass eccentrically secured thereto rotatably supported within said housing; a sleeve concentrically disposed about said shaft and having a like mass eccentrically secured thereto in a like fashion; a locking mechanism comprising first lock means fixedly secured to said sleeve and second lock means fixedly secured to said shaft, said first and second lock means being releasably locked together to cause said shaft and said sleeve to rotate together as a unit, and being adapted to be unlocked to permit said shaft and said sleeve to be rotated with respect to one another to angularly adjustably position said masses affixed thereto with respect to one another to vary the amplitude of vibration of said vibration generator.

2. The reaction-type vibrator generator of claim 1, wherein said first lock means comprises an adjusting dial and said second lock means comprises a clutch, the mating faces of said adjusting dial and said clutch having a plurality of teeth thereon which meshingly engage to releasably lock said adjusting dial and said clutch together to cause said shaft and said sleeve to rotate together as a unit.

3. The reaction-type generator of claim 2, further including a locknut threadedly affixed to said shaft so as to engage and forcibly urge said clutch in engagement with the adjusting dial affixed to the sleeve concentrically disposed about it, to meshingly engage the teeth thereon to releasably lock said adjusting dial and said clutch together.

4. The reaction-type vibrator 'f claim 3, wherein biasing means are affixed to one of said adjusting dial and said clutch for biasing said clutch out of engagement with said adjusting dial, whereby said clutch and said adjusting dial are automatically disengaged when said locknut is loosened.

5. The reaction-type vibration generator of claim 3, wherein said adjusting dial has a displacement scale affixed to it and said clutch has an index marker affixed to it, said displacement scale and said index marker being affixed thereto and calibrated in a fashion such that the amplitude of vibration of said vibration generator can be adjusted by aligning said index marker with corresponding indicia on said displacement scale.

6. A reaction-type vibration generator comprising a housing; a pair of shafts each having a mass eccentrically secured thereto rotatably supported within said housing and adapted to be rotated in opposite directions in synchronism; a sleeve concentrically disposed about each of said shafts and having a like mass eccentrically secured thereto in a like fashion; a locking mechanism associated with each of said shafts, said locking mechanisms each comprising first lock means fixedly secured respectively to one of said sleeves and second lock means fixedly secured to the associated one of said shafts, said first and second lock means being releasably locked together to cause said shaft and said sleeve associated with it to rotate together as a unit, and being adapted to be unlocked to permit said shaft and said sleeve to be rotated with respect to one another to angularly adjustably position said masses affixed thereto with respect to one another to vary the amplitude of vibration of said vibration generator.

7. The reaction-type vibration generator of claim 6, wherein each of said first lock means comprises an adjusting dial and each of said second lock means comprises a clutch, the mating faces of said adjusting dials and said clutches having a plurality o teeth thereon which meshingly engage to releasably lock said adjusting dials and said clutches together to cause said shafts and said sleeves with which they are respectively associated to rotate together as a unit.

8. The reaction-type generator of claim 7, further including a locknut threadedly affixed to each of said shafts so as to engage and forcibly urge the clutch associated with that shaft in engagement with the adjusting dial affixed to the sleeve concentrically disposed about it, to meshingly engage the teeth thereon to releasably lock said adjusting dial and said clutch together.

9. The reaction-type vibrator of claim 8, wherein biasing means are affixed to each associated pair of adjusting dials and clutches for biasing said clutch out of engagement with said adjusting dial, whereby said clutches and said adjusting dials are automatically disengaged when said locknuts are loosened.

10. The reaction-type vibration generator of claim 8, wherein each of said adjusting dials has a displacement scale affixed to it and each of said clutches has an index marker affixed to it, said displacement scale and said index markers being affixed thereto and calibrated in a fashion such that the amplitude of vibration of said vibration generator can be adjusted by aligning said index markers with corresponding indicia on said displacement scales.

* * * * *